July 29, 1924.

W. CAMPBELL

1,502,904

ELASTIC FLUID TURBINE ROTOR AND METHOD OF AVOIDING TANGENTIAL BUCKET VIBRATION THEREIN

Filed June 22, 1923      6 Sheets-Sheet 1

Inventor:
Wilfred Campbell,

His Attorney

Inventor:
Wilfred Campbell,
by
His Attorney.

July 29, 1924.

W. CAMPBELL
ELASTIC FLUID TURBINE ROTOR AND METHOD OF AVOIDING TANGENTIAL
BUCKET VIBRATION THEREIN
Filed June 22, 1923

Inventor;
Wilfred Campbell,
by
His Attorney,

July 29, 1924.

W. CAMPBELL

ELASTIC FLUID TURBINE ROTOR AND METHOD OF AVOIDING TANGENTIAL
BUCKET VIBRATION THEREIN.

Filed June 22, 1923

Inventor:
Wilfred Campbell
by
His Attorney

Patented July 29, 1924.

1,502,904

UNITED STATES PATENT OFFICE.

WILFRED CAMPBELL, OF SCHENECTADY, NEW YORK, ASSIGNOR TO GENERAL ELECTRIC COMPANY, A CORPORATION OF NEW YORK.

ELASTIC-FLUID TURBINE ROTOR AND METHOD OF AVOIDING TANGENTIAL BUCKET VIBRATION THEREIN.

Application filed June 22, 1923. Serial No. 647,193.

*To all whom it may concern:*

Be it known that I, WILFRED CAMPBELL, a subject of the British Empire, residing at Schenectady, county of Schenectady, State of New York, have invented certain new and useful Improvements in Elastic-Fluid Turbine Rotors and Methods of Avoiding Tangential Bucket Vibration Therein, of which the following is a specification.

In large steam turbines operating condensing the volume of steam which must be handled in the low pressure end of the turbine becomes enormous. For example, one pound of steam at 250 pounds pressure, and 250 degrees superheat, has a volume of approximately 2.6 cubic feet. When it has expanded to a vacuum corresponding to 29 inches of mercury, it has a volume of approximately 600 cubic feet and if further expanded to a pressure corresponding to 29½ inches of mercury vacuum, its volume becomes of the order of 1200 cubic feet. This means that a large bucket or blade area is required in the low pressure end of a turbine to handle the volume of steam. In the first instance, of course, this was obtained by increasing the diameter of the low pressure end of the rotor and the length of the buckets or blades. However, the possible diameter is definitely limited by the necessity of keeping the peripheral speed within safe limits, and as the capacity of turbines increased and the vacuum obtained improved, the buckets soon reached a length where difficulties were experienced due to tangential vibration of the buckets, such vibration causing fatigue of the metal and failure of the buckets. It will be understood that by tangential vibration I mean vibration of the buckets in the plane of the ring or row of buckets.

The presence of tangential vibration in long buckets was recognized at an early date in turbine development and the first solution offered was that of fastening or lacing the buckets together at a point or points intermediate between their ends in order to stiffen or brace the buckets. This, however, while it was beneficial in some cases did not solve the problem for in spite of such bracing or lacing there were bucket failures which could be attributed to no other cause than that of tangential vibration. Another remedy suggested was that of making the buckets heavier and stiffer to give them such a high natural frequency that they would be free from vibration but this was not a practical solution of the problem because the added weight of the buckets increased to too great an extent the centrifugal stresses making anchoring of the buckets in the wheel or drum very difficult, if not impossible. Furthermore, the addition of weight to buckets to increase their stiffness soon reaches its limits on account of the rapid increase in the centrifugal stresses, which would soon become so great as to tear the buckets in two. On the other hand, a reduction in peripheral speed to reduce the resulting centrifugal stresses, while suggested, amounted of course, to a step in the wrong direction since it meant poorer economy for the same number of stages or the provision of additional stages with the attendant higher cost. The result was a very definite check in the length of buckets and a resort to other means such as the so-termed "double flow" and "cross compound" types of turbines for obtaining the necessary bucket area to handle efficiently the volume of low pressure steam. Such turbines, however, while satisfactory in many respects offer the serious objections of being larger and more costly than "single flow" machines and not offering the possibility of such high efficiency.

It is well known, of course, that the turbine is essentially a high speed machine, and to increase the efficiency higher and higher bucket speeds have been resorted to. As an illustration of this while bucket speeds of the order of 325 feet per second was the average twenty years ago, and 650 feet per second ten years ago, more recently bucket speeds of 800 feet per second have been used and even higher speeds proposed. This has required the use of buckets of lighter and lighter weight for a given length in the low pressure end of the turbine, in order to keep the centrifugal stresses within permissible limits, such lighter weight being obtained in the case of longer buckets by tapering them in thickness or width or in both thickness and width from the roots to the tips. Tapering of the buckets has the effect of increasing to some extent the natural frequency of vibration of the buckets. However, even with buckets of this construction the limit in length is soon reached on account of the fact that in practical bucket design the natural frequency of vibration cannot be made to increase the desired amount and it was recognized that if the natural frequency of vibration approached too closely the normal speed of operation of the turbine, tangential vibration of a serious character was likely to result.

In a paper published in Engineering (London) issue of February 9, 1923, page 186, the authors state:—

"It has long been the standard rule amongst makers using methods of fastening other than riveting," (i. e., fastening the blades to the rotor) "that the calculated critical speed of the blade must be at least 3.5 times the running speed if failures of blades due to vibration troubles are to be avoided." (Note: By "critical speed of the blade" the authors refer to natural frequency of vibration.)

This rule means that for a turbine operating at 30 revolutions per second, no buckets should be used having a calculated natural frequency of vibration less than 105 per second, which in actual practice for buckets having a peripheral speed of the value now in vogue limits the maximum bucket length to such an extent that large single flow turbines cannot be built.

Again, for buckets of any given length it is desirable to make them as light as possible so as to keep the centrifugal stress low, but usually buckets have been made heavier than necessary, so far as the stresses are concerned, in order to stiffen them sufficiently to bring their natural frequency of vibration within the rule above set forth.

The object of my invention is to provide an improved turbine rotor wherein buckets having natural frequencies of tangential vibration less than 3.5 times the normal operating speed may be safely used and will be entirely free from tangential vibration at the normal operating speed, and to provide methods whereby this result may be accomplished.

By my invention, I am enabled to safely use buckets having a natural frequency of tangential vibration not only somewhat less than 3.5 times the normal operating speed but even directly in the neighborhood of the normal operating speed which enables me to use longer and lighter buckets than has heretofore been considered feasible, having due regard for safety. In one case with which I am familiar, buckets 34 inches long were used originally in the last row of a large turbine. After a time, however, these buckets failed and were finally replaced with buckets 28 inches long, it being then considered not safe to use the longer buckets on account of the low value of their natural frequency of vibration. By my invention, however, I would be able now to use with absolute safety, buckets 34 inches long, or even longer.

I have discovered that for every speed of rotation, the buckets of a bucket row have a definite, natural frequency of tangential vibration, the numerical value of which increases with the speed in accordance with certain definite laws referred to hereinafter, and that when this natural frequency at a given speed of rotation is two times or three times such speed of rotation, tangential vibration of a dangerous character is liable to occur. The probable reasons for this are pointed out more fully hereinafter. I have found that in ordinary practice, a bucket or a bucket row having a natural frequency of vibration at a given speed of rotation which is four or more times such speed of rotation is of such stiffness in comparison with the speed and the amplitude of the vibration which is set up is so small that there is little likelihood of trouble, and it is for this reason that turbine builders in arbitrarily following the rule above set forth have usually avoided trouble. However, as is pointed out hereinafter, it is well to avoid running frequencies of tangential vibration four times the speed of rotation and by my invention I am enabled to do this.

I have furthermore discovered that if the natural frequency of tangential vibration of the buckets of a bucket row at the normal operating speed is not such a multiple of the normal operating speed, then dangerous tangential vibrations do not occur. In this connection, it is to be carefully noted that the natural frequency of tangential vibration of a bucket or a bucket row at a given speed of rotation is not the same as its natural frequency of tangential vibration when standing, and, in addition to the foregoing, I have found that the natural frequency of tangential vibration of the buckets of a bucket row for any particular rotor speed and hence frequencies which are multiples of the speed can be definitely predetermined within certain limits as is pointed out more fully hereinafter. The speeds at which tangential vibration of the buckets of a bucket row occur, i. e., the speeds corresponding to frequencies of tangential vibration which are multiples of the running speed, may be termed "critical speeds."

According to my invention, therefore, I utilize, in such parts of the turbine as it is found desirable, buckets having natural frequencies of tangential vibration less than 3.5 times the normal operating speed, and I then so proportion or "tune" the bucket rows built up from such buckets that the rotor speeds at which the natural frequencies of tangential vibration of the bucket rows correspond to two times, three times, and preferably also four times the normal operating speed of the turbine are not in any instance approximately equal to the normal operating speed, and are removed therefrom by amounts which provide a factor of safety such that tangential vibration will not develop at the normal operating speed.

In carrying out my invention, I take the bucket-carrying element which may be in the form of a wheel or a drum such as is now in common use and mount thereon in the usual or desired manner buckets which from calculations or experience it is known or expected will have a natural frequency of vibration less than 3.5 times the normal operating speed of the turbine. I then determine for each row of buckets in the manner hereinafter described or in any other suitable manner, the rotor speeds at which the natural frequencies of tangential vibration of the buckets are multiples of the rotor speeds. I then compare these rotor speeds, which may be termed "critical speeds" with the normal operating speed at which the rotor is to be run. If these critical speeds are removed from the normal operating speed by amounts such as in each instance to provide a reasonable factor of safety, then such rotor may be used without danger of bucket failures due to tangential vibration. On the other hand if any of such critical speeds are close to the normal operating speed then such rotor may not be safely used until the row or rows of buckets having critical speeds close to the normal operating speed are modified in one or more of the ways hereinafter pointed out to change their natural frequency of tangential vibration by either raising or lowering it so as to move such critical speeds away from the normal operating speed.

Figures 1, 4:
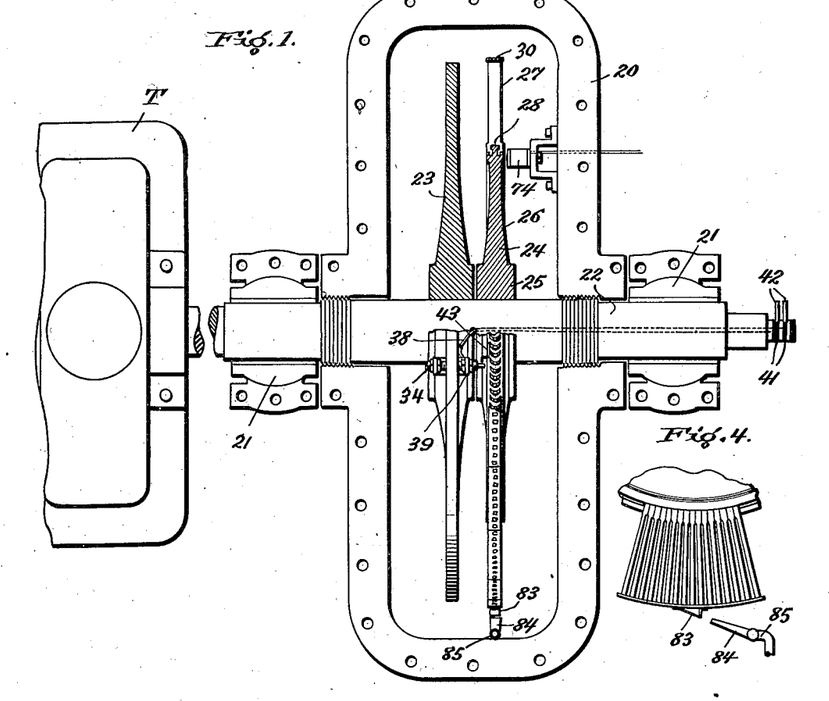
Fig. 1 is a top plan view of a testing machine used in carrying out my invention, the cover of the casing being removed.
Figs. 2, 3 and 4 are detail views thereof.
Figure 2:
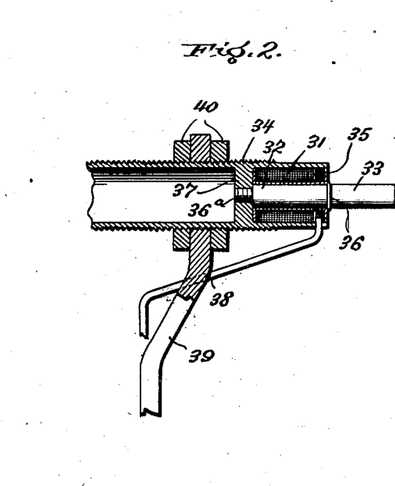
Figure 3:
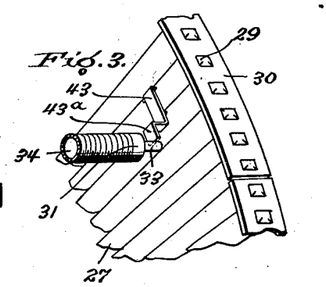

In order to observe or record the critical speeds for a bucket row, that is, the speeds at which the natural running frequencies of tangential vibration are multiples of the running speed, I may employ any means adapted for the purpose but preferably I made use of standard oscillographs and an exploring coil. An arrangement which may be used is illustrated in Figs. 1 to 5 inclusive. In Fig. 1, 20 indicates a casing which in this instance is the casing of a special wheel-testing machine. Only the lower portion of the casing is shown, the upper portion being omitted in order to expose the interior. The upper portion is in the form of a dome which when bolted to the lower portion forms a steam tight casing. The casing is provided with bearing 21 in which is journaled a shaft 22. Mounted on shaft 22 is a heavy practically vibrationless disk 23 and adjacent thereto a turbine bucket wheel 24, the buckets 27 of which are to be tested for tangential vibration. The bucket wheel illustrated is a reproduction of a known standard type comprising a hub 25, and a web 26, on the periphery of which are fastened the buckets 27 by a dovetail connection as indicated at 28. The outer ends of the buckets are provided with tenons 29 which hold in place the bucket cover 30, the tenons passing through openings in the bucket cover and being peened over at their ends to rivet the bucket cover in position. The bucket cover is made in sections in the usual manner thus dividing the buckets of the row into groups, the buckets of each group being connected by a bucket cover section. Connected to shaft 22 is a suitable machine for rotating the shaft at any desired speed, a steam turbine T being indicated. As stated above, casing 20 is steam-tight and when tests are being made a vacuum pump is connected to the casing and operated to maintain a suitable vacuum therein, a small amount of steam being at the same time circulated through the casing to cool the turbine wheel. Otherwise, the wheel, even though rotating in a fairly good vacuum, may become excessively heated due to friction with the medium with which it is surrounded. Suitable pipes, not shown, are provided for the vacuum pump and cooling steam connections.

Mounted adjacent to the periphery of disk 23 is an exploring coil 31 having a core 32 provided with an extension 33 which projects into proximity to the outer ends of buckets 27. Since this coil is located inside casing 20 it should be steam-proof and to this end it may be completely enclosed in a metal casing. In the present instance coil 31 is shown as being carried within the end of a tube 34 of magnetic material. The end of tube 34 is closed by a cover plate 35 of brass or the like held in place by a flange 36 on core 32, the inner end of core 32 being provided with a threaded extension 36ª which screws in a wall 37 to hold the parts assembled. The electrical connections to coil 31 are made by means of suitable steam-protected and electrically-insulated wire, metal cased wire as indicated at 38 being shown. Tube 34 is mounted in an opening in the periphery of disk 23 and is supported at its ends by U-shaped brackets 39 fastened to the disk as shown in Fig. 1. The ends of tube 34 are threaded to receive lock nuts 40 which serve to hold the tube and also to permit of its adjustment in an axial direction. The leads from coil 31 are carried down along the side of disk 23 and are brought out through shaft 22 to slip rings 41 on the shaft. At 42 are brushes which bear on the slip rings. Attached to buckets 27 by brazing or other suitable means is a strip of magnetic material 43 which presents an end 43ª to the side of core extension 33 and forms an armature for the core. With this arrangement, it will be seen that any movements of the buckets 27 in the plane of the wheel relatively to the core extension 33 will have the effect of moving armature 43ª toward and away from the core extension thereby affecting the magnetic circuit and hence the current flow in coil 31, and since coil 31 and core extension 33 are fixed relatively to the wheel and rotate with it, the coil is in a position to indicate tangential vibration of the buckets.

Figure 5:
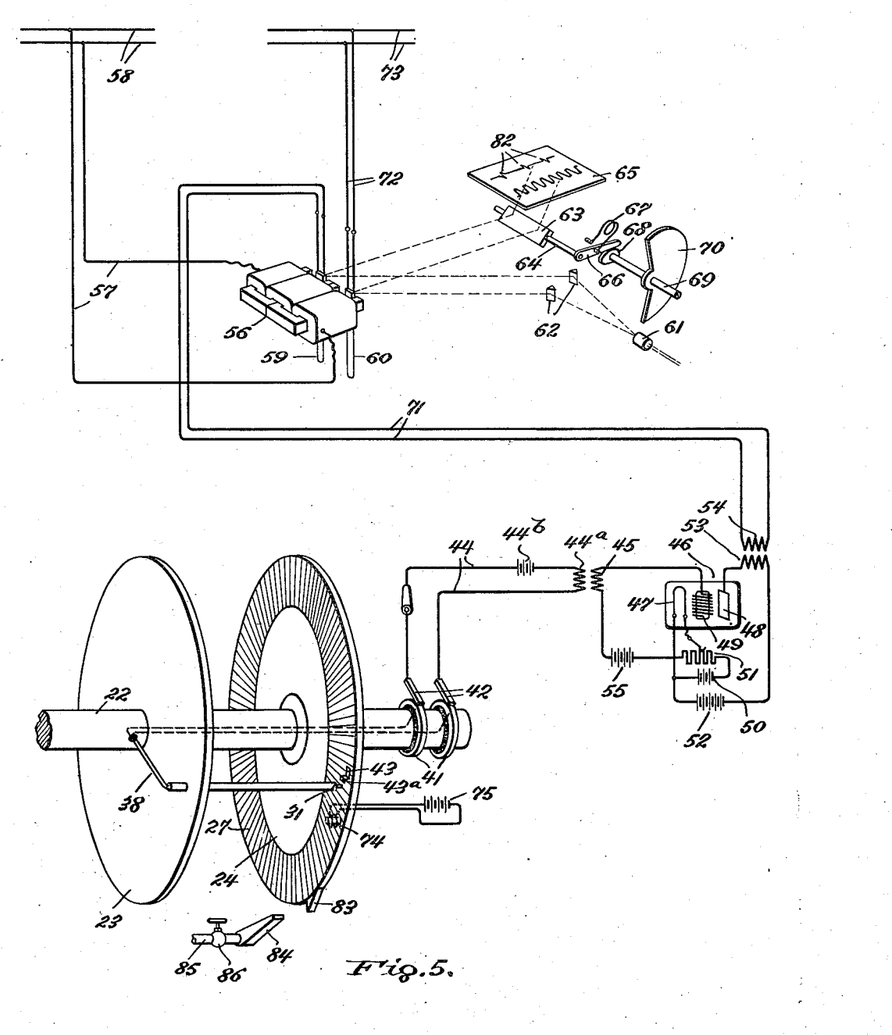
Fig. 5 is a diagram of circuits used in connection with the testing machine shown in Figs. 1 to 4.

The electrical connections of coil 31 to the amplifier and oscillograph are shown in Fig. 5. In this figure, for purposes of clearness, the rigid disk 23 and the bucket wheel 24 are indicated in a conventional manner and as being abnormally displaced laterally so that the circuits may more clearly appear. The leads 38 from coil 31 come out through the shaft 22 and are connected to slip rings 41 and brushes 42. Brushes 42 are connected by lead wires 44 to the primary winding 44ª of a transformer and in this circuit is a suitable source of direct current 44ᵇ which causes current to flow normally through coil 31. The secondary winding 45 of the transformer is connected to a suitable amplifying device for magnifying the fluctuations of current produced in coil 31. Such amplifiers are well understood in the electrical art and require here no special description. An amplifier of this character is, for example, set forth in the patent to Loewenstein No. 1,231,764, July 3, 1917. In the amplifier circuit connected to secondary winding 45, the amplifying tube is indicated at 46. This is an evacuated tube provided with a hot cathode 47, a plate or anode 48 and a grid 49. A battery 50 supplies current to cathode 47 and a rheostat 51 serves to adjust the current through the cathode. A circuit connects the plate 48 with the cathode 47 through a source of current 52 and in this circuit there is connected the primary 53 of a transformer, the secondary 54 of which is connected to the oscillograph as will be described. A battery 55 of a few volts is placed in the grid circuit as shown, to give a negative bias to the grid.

The operation of amplifiers of this character is well understood. Fluctuations in voltage produced in the secondary 45 are transmitted to the grid 49, and the changes in potential of the grid cause magnified changes to occur in the current flowing in the circuit of plate 48. These magnified current changes produce corresponding current fluctuations in the secondary 54 leading to the oscillograph.

The oscillograph, indicated diagrammatically in the upper portion of Fig. 5, is a standard instrument well understood in the electrical arts, for producing and for recording images representing the fluctuations from instant to instant of electric currents. These images may be produced by the tracing of a point of light upon a ground glass or in a mirror, or the images may be recorded permanently on a photographic film. Oscillographs of this character are set forth for example in the U. S. patent to Robinson, No. 919,467, dated April 27, 1909 and also in a paper on "The Oscillograph and its Uses," by L. T. Robinson, appearing in the Transactions of the American Institute of "Electrical Engineers" for April 28, 1905, Vol. XXIV, pages 185 to 214. The field magnets of the oscillograph are indicated at 56. They are connected by lead wires 57 to a suitable source of direct current indicated by the supply lines 58. For each of the field magnets 56, two being shown in the present instance, there is a sort of bifilar suspension 59 and 60 which carries as usual a small mirror. Light from a suitable source, such as an arc lamp (not shown) is transmitted by a lens 61 and prisms 62 to these mirrors and reflected in turn by them onto the surface of the oscillating mirror 63 of the oscillograph. Mirror 63 oscillates about an axis 64 and when oscillated the wave forms produced by the mirrors carried by the bifilar suspensions 59 and 60 are rendered visible either by viewing the pivoted mirror 63 directly or by reflection on a semi-transparent receiving screen 65.

Mirror 63 is oscillated by an arm 66 fixed on the shaft of the mirror and held by a spring 67 in contact with a cam 68. Cam 68 is driven by a synchronous motor (not shown) connected with cam shaft 69. The synchronous motor receives current from a small alternator (not shown) driven directly by the shaft 22 so that the cam shaft is driven at the same speed as shaft 22, the result being that the wave motion recorded by the coil 31 appears to be stationary instead of progressing across the field of vision.

The illumination of the screens 65 is interrupted each revolution by shutting off the light source by means of a shutter 70. During this dark period the cam causes the mirror to assume its initial position, the light then being allowed to again illuminate the screen. Actually, only a spot of light is reflected on the screen, but owing to the rapid rotation of the cam shaft and the faculty known as the "persistency of vision," the light spot appears as a complete more or less wavy line. This arrangement is well known in the art and set forth, for example, in "Industrial Electrical Measuring Instruments" pages 378 and 379, published in 1918, by Constable and Company, Ltd., London, England.

The bifilar suspension 59 is connected by lead wires 71 to the secondary transformer winding 54. Wave motions traced by bifilar suspension 59 will be those due to fluctuations in the current flowing in exploring coil 31 and will indicate the presence and the amplitude of the tangential vibration of the bucket row. It will be understood that the current in coil 31 develops a magnetic field, the magnitude of which varies in accordance with the variation in the length of the air gap between armature 43[a] and core extension 33, and that movements of armature 43[a] toward and away from core extension 33 produce a change in magnetic reluctance and hence in the current flowing in the coil. By observing the speeds of rotation of shaft 22 at which vibration occurs, the "critical speeds" are readily determined. The speed of rotation of shaft 22 may be determined by any suitable form of tachometer or rotation-registering device.

It is desirable to be able to determine accurately the frequency of the tangential vibration at any instant and for this purpose I provide what may be termed a timing wave which may be recorded alongside the wave indicating the tangential vibration. To this end I connect the bifilar suspension 60 by lead wires 72 to a source of alternating current 73 of some definite constant frequency, such as 40 cycles per second, so that the indications produced through the operation of this member of the oscillograph serve as a time standard for the waves produced by the bifilar suspension 59. Also as a check on the tachometer for shaft 22 and to provide a permanent record I may provide means for indicating the speed of rotation on the oscillograph. For this purpose, I may provide adjacent to the wheel some stationary means which, as coil 31 passes it, will cause a fluctuation of the current in the coil. For this purpose, an electromagnet 74 excited from any suitable source such as the battery 75 may be used. Each time coil 31 passes magnet 74 there will be a fluctuation of the current in coil 31 which will be recorded on the oscillograph.

Figure 6:
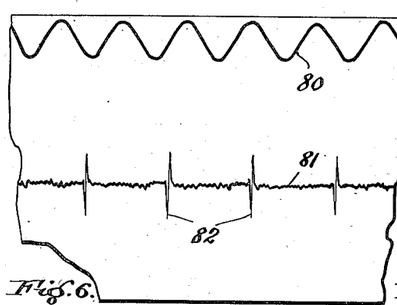
Figs. 6, 7, 8, 9 and 10 are reproductions of typical oscillograph records.

Fig. 6 is a reproduction of a photograph of a typical oscillograph record traced by the oscillograph shown in Fig. 5. In this record 80 indicates the timing wave and 81 the line traced by exploring coil 31. In the line 81, the points 82 are those caused by coil 74 when coil 31 passes it, and the distance between them indicates the time of each revolution. By comparing the occurrence of these points with the timing wave 80, the speed of rotation can be accurately determined. The frequency of tangential vibration as well as its amplitudes is indicated by wave 81. The particular lines 81 shown in Fig. 6 indicates the absence of any tangential vibration, the line being substantially straight except for the regular occurrence of points 82.

In actual practice, the oscillograph illustrated is used preferably for observation purposes only. For photographic work I provide a second oscillograph (not shown) connected in parallel with the one shown and fitted for taking oscillograph films in a manner well understood in this art. With this arrangement the operator observes the wave phenomena in the one oscillograph and photographs are taken by the other oscillograph whenever phenomena are observed of which it is desired to make a permanent record.

When the buckets of a rotor are being tested for tangential vibration, it is usually not necessary to provide any special means for setting the buckets into vibration, although on occasions some such means may be useful. For this purpose I find it satisfactory to fasten an abutment as indicated at 83 on one of the bucket cover sections and provide a nozzle 84 for directing a jet of steam against it. The abutment may be made from a flat strip bent up to provide a flat radially-extending surface, and may be fastened to the bucket cover segment by brazing or the like. Nozzle 84 may be supplied with steam from any suitable source by a pipe 85 in which is arranged a valve 86. With this arrangement, upon each revolution of the wheel, the jet of steam in striking the abutment will give an impulse to the buckets in a tangential direction.

In my investigation I have found that apparently when tangential vibrations of a marked character occur, the entire bucket row usually vibrates as a whole, all the buckets or groups of buckets vibrating in unison. This would seem to indicate that such vibration is set up by a slight force applied at regular intervals during each revolution of the wheel, and it is for this reason that the dangerous amplitudes of tangential vibration occur at frequencies which are multiples of the wheel speed.

Figure 7:
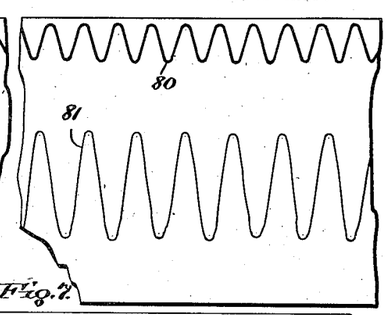

In testing a bucket row for tangential vibration, I prefer in the first instance to determine its natural period of tangential vibration when the rotor is stationary. This may be done any time after the bucket row has been assembled on the rotor, and in any suitable manner, it being only necessary to set the buckets into vibration by some artificial means and then determine the frequency. With the arrangement shown in Fig. 5, for example, I may simply force an ordinary screw driver or other implement between an end of the bucket cover of the group of buckets to which strip 43 is fastened and the next adjacent group so as to flex the bucket group and then remove the screw driver and permit the bucket group to vibrate. Such vibrations will be recorded in the oscillograph and by comparing the wave produced with the timing wave, the natural frequency of tangential vibration is readily determined. A reproduction of such an oscillograph record is shown in Fig. 7 wherein 80 is the timing wave and 81 the wave due to tangential vibration. Comparing these waves, it will be seen that for the particular bucket row being tested, the buckets had a natural period of tangential vibration, when standing, of 28 cycles per second.

Figure 8:
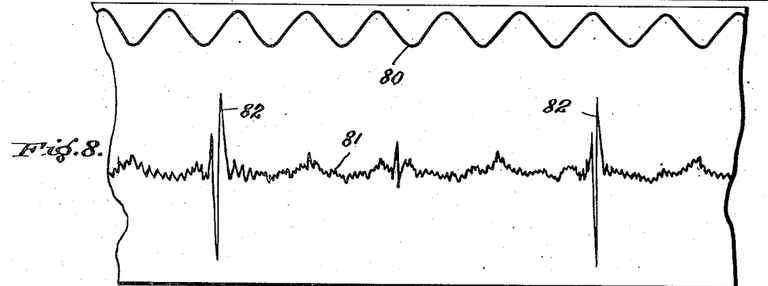

If now the rotor carrying the buckets is rotated there will be observed in the oscillograph, two records of the character of those shown in Fig. 6, i. e., a timing wave 80, and the line 81, the latter being a straight line having a point 82 at regular intervals. As the speed of rotation increases a speed will be reached at which line 81 ceases to be a straight line and assumes an undulating form, and then, as the speed continues to increase, assuming again the form of a straight line, thus indicating that at the particular speed there has occurred tangential vibration of the bucket. Or, in other words, that a "critical speed" for tangential vibration has been passed through. An oscillograph record indicating such a critical speed is shown in Fig. 8, wherein it will be observed that the line 81 is in the form of a wave of some amplitude, on which at regular intervals are the rotation points 82. Comparing the wave 81 in Fig. 8 with the timing wave 80 it will be found that, in the particular instance the frequency of vibration was approximately 29.6 per second and the speed of rotation was 7.4 per second, thus indicating the occurrence of tangential vibration of a frequency four times the speed of rotation. The oscillograph record of Fig. 8 is a record of the same buckets as those recorded in Fig. 7 and if the frequency of vibration which occurs at this speed be compared with the standing frequency it will be found to be somewhat higher.

Figure 9:
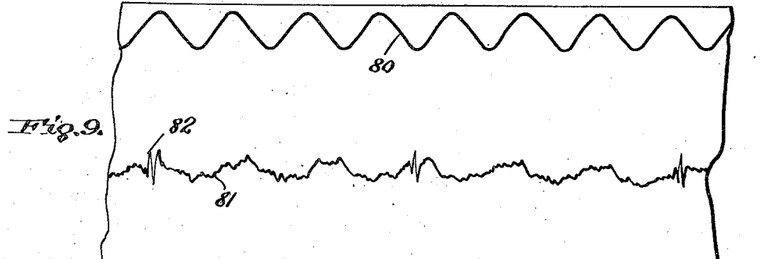
Figure 10:
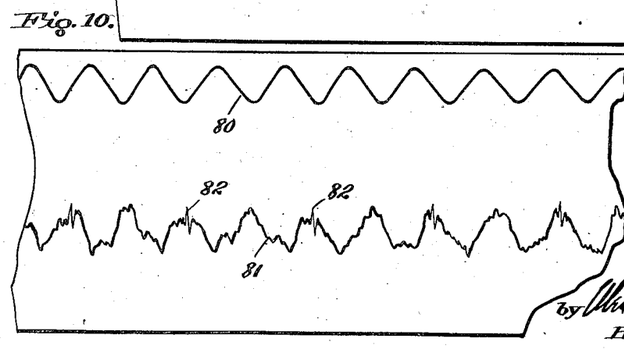

If now the speed of rotation be still further increased another speed will be reached at which tangential vibration will be indicated and upon examining the oscillograph record this will be found to occur at a running frequency of tangential vibration three times the speed of rotation. This is indicated in the oscillograph record shown in Fig. 9, from which it will be found that the frequency of vibration is 33.3 cycles per second, and the speed of rotation 11.1 revolutions per second. Comparing the oscillograph record of Fig. 9 with that of Fig. 8 it will be seen that the amplitude of the vibration occurring at a frequency of tangential vibration three times the speed of rotation is substantially greater than that occurring at four times the speed of rotation and also that the frequency of vibration is greater. Upon still further increase in the speed, another point will be reached at which again tangential vibration occurs and examining the oscillograph record thereof as reproduced in Fig. 10, it will be found to occur at a running frequency of tangential vibration twice the speed of rotation, the frequency of vibration indicated being 43.2 and the speed of rotation 21.6. It will be observed also that the amplitude of vibration occurring at twice the speed of rotation is greater than that occurring at three times or four times the running speed and that the frequency of vibration is greater. Having passed the critical speed of rotation at which tangential vibration corresponding to twice the speed of rotation occurs no further critical speeds will be reached, for, because of the increase in the natural running frequency of vibration with the speed of rotation, the speed of rotation will never become equal to the frequency of vibration of the buckets.

The oscillograph records shown in Figs. 6 to 10 inclusive were all taken on the same bucket row. The rotor was the 17th stage wheel of a 30,000 k. w. turbine having a normal operating speed of 30 revolutions per second. The diameter of the wheel was 125¼ inches and the active length of the buckets was 26 inches. The record shown in Fig. 6 was taken at normal operating speed of 30 revolutions per second.

Critical speeds corresponding to natural running frequencies of tangential vibration five times, six times and even seven times the speed of rotation can be picked up by the oscillograph but for these critical speeds some artificial means such as the steam jet from nozzle 85 must be used in order to set up vibration of appreciable amplitude.

Even then, they are of but small amplitude showing that at critical speeds corresponding to natural running frequencies of tangential vibration five or more times the speed of rotation there is little likelihood of tangential vibrations of a noticeable character occurring and that even if they do their amplitude is so small that they are not dangerous.

Usually also some artificial means must be employed to force vibration in order readily to pick up tangential vibration of a frequency corresponding to four times the speed of rotation, and unless a considerable vibrating force is used the amplitude of the vibration is so small as not to be of a dangerous character. In general the force occurring in the turbine which sets up tangential vibration is small so that except under unusual circumstances, trouble is not likely to be experienced from tangential vibration of this order. However, by my invention, I can readily avoid the buckets having a natural frequency of tangential vibration four times the running speed and consider it desirable so to do.

It is evident from experiments which I have carried out that the force which sets up tangential vibration in buckets is a small force applied once each revolution of the rotor. Its cause, however, is not definitely understood. If the natural frequency of tangential vibration is exactly twice the speed of rotation it will be clear that a force applied once each revolution will be timed correctly to give to the buckets an impulse every other vibration and such a force even though exceedingly small if continuously applied in synchronism with the vibration will cause vibration of considerable amplitude. If the natural running frequency of tangential vibration is exactly three times the speed of rotation, then the force tending to set up tangential vibration is applied only every third vibration from which it will be obvious that the amplitude of the vibration set up at this frequency will not be as large as those at a frequency corresponding to two times the speed of rotation. Again, if the natural running frequency of tangential vibration is four times the speed of rotation then the force tending to set up tangential vibration is applied only every fourth vibration meaning, of course, a still smaller amplitude of vibration and one which, except under unusual circumstances, is negligible. For natural running frequencies of tangential vibration corresponding to five or more times the speed of rotation, the impulse applied is at such infrequent intervals that it need not be considered.

Figure 11:
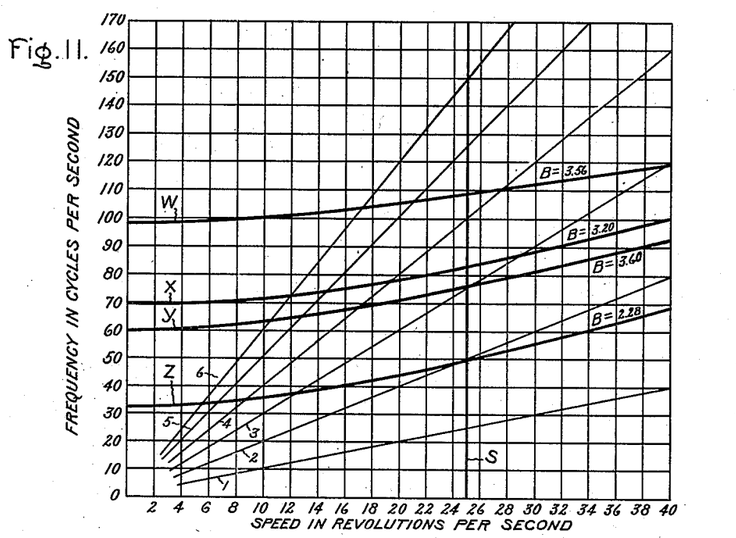
Figs. 11 and 12 are diagrams.
Figure 12:
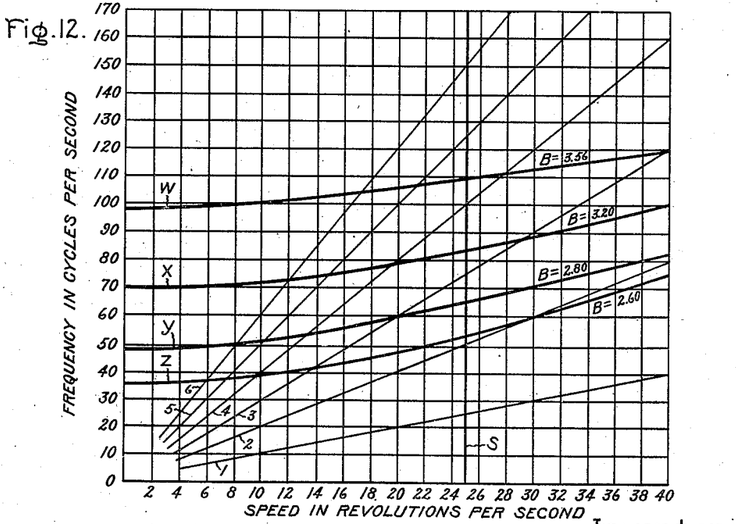

In testing the bucket rows of a rotor for tangential vibration, I find it desirable to make a chart or diagram of the rotor of the character shown in Figs. 11 and 12. In these diagrams the ordinates represent frequency of tangential vibration in cycles per second and the abscissae represent speed of rotation in revolutions per second. The diagonal lines numbered 1, 2, 3, 4, 5 and 6 are lines drawn through the points representing respectively frequencies of vibration one, two, three, four, five and six times the speed of rotation. Having determined the natural frequency of tangential vibration of a bucket row when standing and at its various critical speeds, I plot these points on the diagram and then draw a line through them. This line then indicates the natural frequency of tangential vibration for each speed, the point at which it crosses any of the lines 1 to 6 inclusive being a "critical speed."

Referring to Fig. 11, the curves W, X, Y and Z may be taken to represent for example the last four rows of buckets of a turbine, the curve Z representing the last row, Y the next to the last row, X the third from the last row, and W the fourth from the last row. These curves have been drawn by obtaining a number of points as indicated in the preceding paragraph, and then plotting the curves through them. Examining the curve Z for the last bucket row, it will be seen that the buckets when standing have a natural frequency of tangential vibration of 32 cycles per second, and that this increases with the speed until at a speed of rotation of 40 revolutions per second the buckets have a natural running frequency of tangential vibration of 68 per second. Curve Z crosses line 2 which represents frequencies twice the running speed at a point representing 24.5 revolutions per second so that this is a critical speed for the bucket row and if the rotor is operated at approximately this speed, tangential vibrations of a dangerous character are likely to be set up. Curve Z crosses the line 3 which represents frequencies three times the speed of rotation at a point representing 12.5 revolutions per second so that this is another "critical speed" for the bucket row, and it crosses the lines 4, 5 and 6 at speeds corresponding respectively to approximately 8.5, 7 and 5 revolutions per second, which are additional "critical speeds." Examining the curve Y for the next to the last row of buckets it will be seen that the buckets have a natural frequency of tangential vibration when standing of 60 cycles per second which increases to 93 cycles per second at a speed of 40 revolutions per second. The curve Y does not cross line 2 which indicates that within the range of the speeds plotted there is no critical speed for these buckets corresponding to twice the speed of rotation. It crosses the line 3 at a speed corresponding to 25.5 revolutions per second and the line 4 at a speed corresponding to 17 revolutions per second, so that these are "critical speeds" corresponding to natural frequencies of tangential vibration three times and four times the speed of rotation respectively. "Critical speeds" corresponding to five times and six times the speed of rotation are found at 13 revolutions per second and 10.5 revolutions per second respectively. In a similar manner the frequency of tangential vibration at any speed and the "critical speeds" for the bucket rows represented by curves X and W are readily ascertained from the diagram.

The vertical line S in Fig. 11 indicates the normal operating speed, such speed being 25 revolutions per second in the present instance and it will be seen that the last bucket row Z has a "critical speed" corresponding to twice the rotor speed at practically the normal operating speed of the turbine and that the next to the last row of buckets has a critical speed corresponding to three times the rotor speed at practically the normal operating speed of the turbine. On the other hand, the critical speeds of the third and fourth from the last rows of buckets X and W are well removed from the normal operating speed. It follows, therefore, that for the case shown in Fig. 11 the last and next to the last rows of buckets have "critical speeds" so close to the normal running speed that they would be subject to tangential vibrations of a dangerous character, and this was what actually occurred, bucket rows running under the conditions illustrated by Z and Y having failed in actual service due to tangential vibration.

Fig. 12 is to be taken to illustrate the same turbine represented in Fig. 11 except that the last two rows of buckets Z and Y have been modified in one or more of the ways explained hereinafter to change their natural frequencies of tangential vibration so they will no longer have critical speeds in the immediate vicinity of the normal operating speed. Referring to the last bucket row it will be seen from Fig. 12 that it has been modified so as to increase its natural frequency of vibration when standing from 32 cycles per second to 35 cycles per second and that this has served to increase its "critical speed" corresponding to twice the running speed to 29.7 revolutions per second thus moving it well away from the normal operating speed of 25 revolutions per second. On the other hand, the next to the last bucket row has been modified so as to lower its natural frequency of vibration when standing from 60 cycles per second to 49 cycles per second which has resulted in reducing its critical speed corresponding to three times the speed of rotation from 25.5 revolutions per second to approximately 20 revolutions per second thus in this case also moving it well away from the normal operating speed of 25 revolutions per second.

The natural frequency of vibration of a member fixed at one end as in the case of turbine buckets is directly proportional to the square root of the stiffness and inversely proportional to the square root of the mass. The fundamental formula for this is $$f = \frac{1}{2\pi}\sqrt{\frac{F}{M}} \text{ where}$$

$f$ = the frequency in cycles per second
$F$ = the stiffness of the member in pounds per foot deflection
$M$ = the mass of the body.

It follows, therefore, that the natural frequency of vibration of a bucket row can be changed by any means which varies either the stiffness or the mass.

Figure 13:
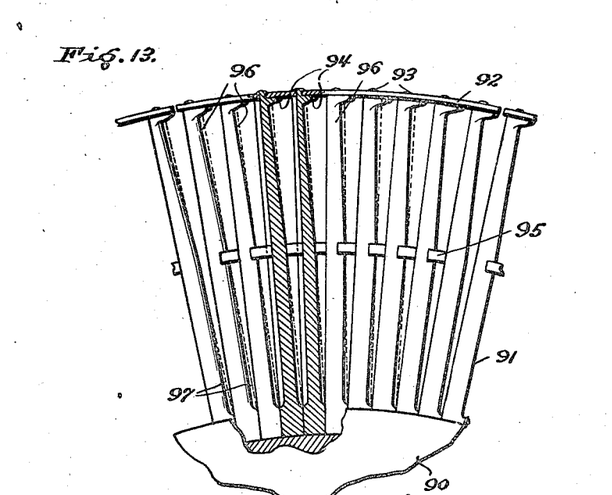
Fig. 13 is a side elevation, partly in section of a turbine rotor in connection with which is illustrated ways of carrying out my invention in correcting bucket rows for tangential vibration.

To increase the natural frequency of vibration I may either increase the stiffness of the bucket row or decrease its mass. In the case of a bucket row of the type wherein the ends of the buckets are fastened together by a sectional bucket cover the stiffness of the bucket row may be increased by making more rigid the connection between the bucket cover and the bucket ends. This is illustrated in Fig. 13 wherein 90 indicates the web of a wheel of an impulse turbine, 91 the bucket row, 92 the bucket cover and 93 the tenons which are used to fasten the cover to the bucket ends. Ordinarily, the bucket cover in this type of wheel is fastened by riveting over the ends of the tenons onto the bucket cover as shown. This gives a good connection but not an absolutely rigid one. I have found that the rigidity of this connection can be increased by soldering or brazing the bucket cover to the bucket ends and that this increases the stiffness of the bucket row and hence increases its natural frequency of vibration. The soldering or brazing of the bucket cover to the buckets is indicated at 94 in Fig. 13. Again the stiffness of the buckets may be increased by providing circumferentially extending stiffening members between the roots and the tips of the buckets. These may take the form of braces 95 located between the buckets and suitably fastened thereto. The natural frequency of vibration of a bucket row can be increased by decreasing the mass of the buckets, care being taken to remove metal at a point where its removal will affect the stiffness by the least amount; i. e., at the outer ends of the buckets. In Fig. 13, the space within the dotted lines 96 indicates the removal of metal from the backs of the buckets adjacent their outer ends for the purpose of increasing the natural frequency of vibration of the buckets. It is ordinarily not practicable to increase the natural frequency of vibration of buckets by adding mass to them and if it is found that for a particular bucket row the frequency of vibration must be increased and it is not possible to accomplish this by means as above set forth, then it may be necessary to redesign the buckets in a manner to give them a higher frequency of vibration.

To decrease the natural frequency of vibration of buckets, the most convenient method is to decrease the stiffness by removing metal from the backs of the buckets particularly in the region of their inner ends. This is illustrated in Fig. 13 wherein the space within the dotted lines 97 indicates the removal of metal for the purpose of decreasing the natural frequency of vibration.

Figure 14:
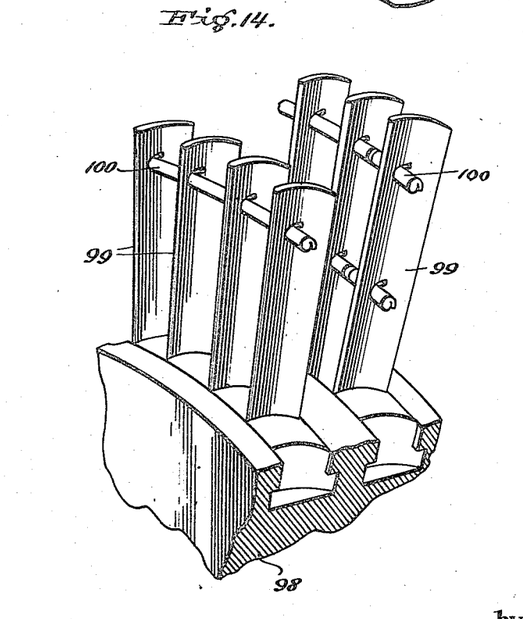
Fig. 14 is a side elevation of a portion of a rotor of a type different from that shown in Fig. 13 and in connection with which my invention may be carried out.

My invention, of course, is equally as applicable to buckets of the reaction type as it is to buckets of the impulse type and may be applied to them in exactly the same way. In Fig. 14 I have illustrated a rotor of the drum type provided with reaction buckets, 98 being the drum or other type of bucket-carrying member and 99 the buckets. In this type of turbine, a bucket cover is ordinarily not provided and the buckets of each row are connected into groups by binding wires or braces 100 fastened to the buckets in any suitable manner. On longer buckets, two or more spaced rows of binding wires or braces may be used. When dealing with this type of buckets the natural frequency of vibration can be best increased or decreased by changing the binding wires to increase or decrease the stiffness of the bucket row either by changing their location, their weight or their number, although any of the other methods enumerated may be employed.

Figure 15:
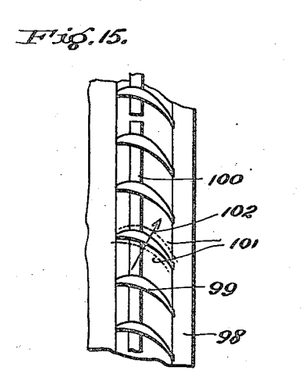
Fig. 15 is a top plan detail view of a bucket row as shown in Fig. 14.

Buckets of the reaction type are ordinarily somewhat flatter and thinner than buckets of the impulse type and are usually set at an angle to the plane of the rotor as indicated particularly in Fig. 15. In vibrating tangentially buckets vibrate about their major axis so that in the case of buckets set at an angle as shown in Fig. 15 the direction of vibration will not be exactly parallel to the plane of the rotor but will be at an angle thereto as indicated by the dotted lines 101 and the arrow 102. The binding wires 100 are usually made in sections each section tying together a group of buckets in the same manner as do bucket covers in structures of the type shown in Fig. 13. In the case of buckets of the type shown in Figs. 14 and 15, therefore the vibration of the buckets is in the nature of group vibration, all the groups of buckets of a row, however, vibrating in unison.

For any given bucket row, I have found that the relation between the running frequency of tangential vibration $f_r$ and the standing frequency $f_s$ at any speed of rotation $N_s$ may be expressed by the following equation:—

$$f_r = \sqrt{f_s^2 + BN_s^2}$$

where B is a coefficient depending upon the physical characteristics of the buckets or bucket row and differs for different buckets or bucket rows. The value of B varies from as low as 2 for long buckets to as high as 4.5 or even higher for shorter buckets and must be determined experimentally for each bucket row. Having determined the average value of B for a particular character of bucket row, however, I can within small limits of error determine the running frequencies of tangential vibration of all bucket rows of this same character by calculation from the natural frequency of tangential vibration of the bucket row when standing obtained in the manner already described or in any other suitable manner. By obtaining by calculations in this manner the running frequencies of a particular row of buckets at a number of speeds and plotting a curve such as those shown in Figs. 11 and 12, the "critical speeds" for the bucket row can be ascertained.

Or, the running speed $N_s$ which is the "critical speed" corresponding to a frequency of vibration "X" times the running speed may be obtained directly from the equation $$N_s = \frac{f_s}{\sqrt{X^2 - B}}$$

by substituting the known values for the standing frequency $f_s$ the multiplicator X and the coefficient B.

This equation is obtained from the preceding equation by substituting $N_sX$ for $f_r$ and solving for $N_s$.

In Figs. 11 and 12 the values of B for the rows of buckets represented by the curves are indicated on the diagrams.

Bucket rows assembled from buckets of exactly the same design and in exactly the same manner will differ considerably in their natural frequency of vibration owing to unavoidable differences which occur during the manufacture and assembly of the buckets on the rotor, particularly the latter, since variations in the tightness with which the buckets are fastened to the rotor and to each other will have considerable effect on the natural frequency of vibration of the completed bucket row. For this reason circulations or tests to determined the natural frequency of vibration of an individual bucket are of little value in determining what the actual natural frequency of vibration will be of a bucket row assembled from such individual buckets. At best, such tests are of value only in showing that the particular buckets when assembled on a rotor will or will not have a natural frequency of fibration enough times greater than the intended normal operating speed to be beyond any danger from tangential vibration. If such calculations or tests show the buckets to have a natural frequency of such low value that when assembled on a rotor they may be subject to tangential vibration of a dangerous character, then, after assembling the bucket row must be tuned in accordance with my invention in order to eliminate the possibility of trouble due to tangential vibration, such tuning comprising the testing of the bucket row and, if found necessary, its modification after the manner already described.

In determining the safe limits which should exist between normal operating speeds of the rotor and the "critical speeds" at which tangential vibrations are likely to occur, a number of considerations are involved. Considering first the "critical speed" corresponding to two times the running speed and which is the most dangerous because of the fact that at this speed a very small force applied in synchronism with the rotation may set up vibrations of a dangerous character, it will be noted in examining the diagrams of Figs. 11 and 12 that the curve Z in crossing the line 2 makes a comparatively small angle with it so that for some little distance on each side of the point where the curve crosses this line, the curve and the line are quite close together. This means that over quite some range of speed the frequency of tangential vibration is approximately two times the running speed and due to the quality of vibrating bodies known as broadness of resonance the period of vibration of the buckets may be changed so as to correspond to a frequency two times the running speed over a considerable range of speed. As a safe margin for this I consider that the "critical speed" corresponding to a frequency of tangential vibration two times the running speed should be removed from the normal running speed by approximately 12% of the running speed.

Another consideration of which account must be taken is the fact that a turbo-alternator when running under practical conditions may for the purpose of adjusting the electrical load taken by the machine when operated in conjunction with other machines and possibly for other reasons, be operated not at exactly its rated speed, but may be raised in speed by as much as 3% or lowered in speed by an equal amount.

Adding together the factors above mentioned gives 15% which is the amount I now consider it advisable that the "critical speed" corresponding to two times the running speed should differ from the normal operating speed. That is, I now consider it advisable that the "critical speed" corresponding to two times the running speed should not be closer to the normal operating speed than 15% of the normal operating speed.

In the case of "critical speeds" corresponding to natural frequencies of tangential vibration three times the running speed, it will be noted from Figs. 11 and 12 that here the curves indicating the natural frequencies of vibrations at the various speeds cross the line 3 at a much greater angle than in the case of the line 2 corresponding to a natural frequency of tangential vibration twice the running speed, which indicates that the range on either side of the "critical speed" at which the natural frequency of vibration is approximately three times the running speed is quite small, so that the broadness of resonance is much less than in the preceding case. I now consider that 7% is a safe margin in this case and adding to this the 3% for variations in the normal operating speed gives 10% which means that in the case of "critical speeds" corresponding to natural frequencies of vibration three times the running speed, such "critical speeds" should not be closer to the normal operating speed than 10% of the normal operating speed.

In the case of "critical speeds" corresponding to natural frequencies of tangential vibrations four times the running speed, it will be noted that the curves indicating the natural frequencies of tangential vibration at the various speeds cross the line 4 at still greater angles than in the previous cases which means that there is little broadness of resonance so that in the case of tangential vibration corresponding to four times the running speed, the frequency must be almost an exact multiple of the running speed before tangential vibration occurs. I now consider that 2% is a safe margin for broadness of resonance in this case and adding to this the 3% for variations in the normal operating speed gives 5% which means that in the case of "critical speeds" corresponding to natural frequencies of tangential vibration four times the running speed, such "critical speeds" should not be closer to the normal operating speed than 5% of the normal operating speed.

After the average value of the coefficient B in the formula hereinbefore referred to has been determined experimentally for a certain size and shape of bucket mounted on a rotor in a certain way, the critical speeds for such bucket row may be calculated from the formula as has been already explained. However, in using this method there is some error due to the fact that the value of B used is an average value. The error which may be present due to this I now estimate to be about 5% plus or minus. If therefore, the critical speeds for a given row of buckets is calculated rather than determined by tests, I now find it advisable to add 5% to the percentages already given, making such percentages read 20%, 15% and 10% for "critical speeds" corresponding to frequencies of tangential vibration two times, three times and four times the running speed, respectively. In actual practice, therefore, I may first determine the several "critical speeds" by calculation and if they are no closer to the normal operating speed than amounts corresponding to the larger percentages of the normal operating speed, I consider that the bucket row may safely be used. If, however, by calculations the "critical speeds" do not fall outside these larger percentages, then I consider it desirable to give the particular bucket row an actual running test to determine experimentally its "critical speeds" and if needs be, correct for them.

The diagrams in Figs. 11 and 12 represent a turbine having a normal operating speed of 25 revolutions per second, this being a common speed for turbines of large capacity, and hence I have indicated in the diagram a speed range up to 40 revolutions per second, this being an ample range in this instance. It will be understood, of course, that in making tests the buckets will be tested only up to speeds a reasonable amount above the intended normal operating speed. A consideration of the curves shown in Figs. 11 and 12 and of the equation for finding the running frequency of tangential vibration at any speed indicates that in no instance will a running frequency of tangential vibration be met with which is just equal to the running speed. Hence the lowest "critical speed" multiple met with in any instance is one corresponding to a natural frequency of tangential vibration two times the running speed. Also it will be apparent that in practice this "critical speed" will occur dangerously near the intended normal operating speed only in the case of buckets having a natural standing frequency of tangential vibration less than two times the intended normal operating speed. For buckets having a natural standing frequency of tangential vibration greater than two times the intended normal operating speed, it will be apparent that a "critical speed" corresponding to tangential vibrations two times such normal operating speed would occur only at a speed far in excess of the normal operating speed and need not be looked for. Hence, knowing the normal operating speed and the standing natural frequency of vibration, it is apparent at once what "critical speeds" need be looked for.

Figure 16:
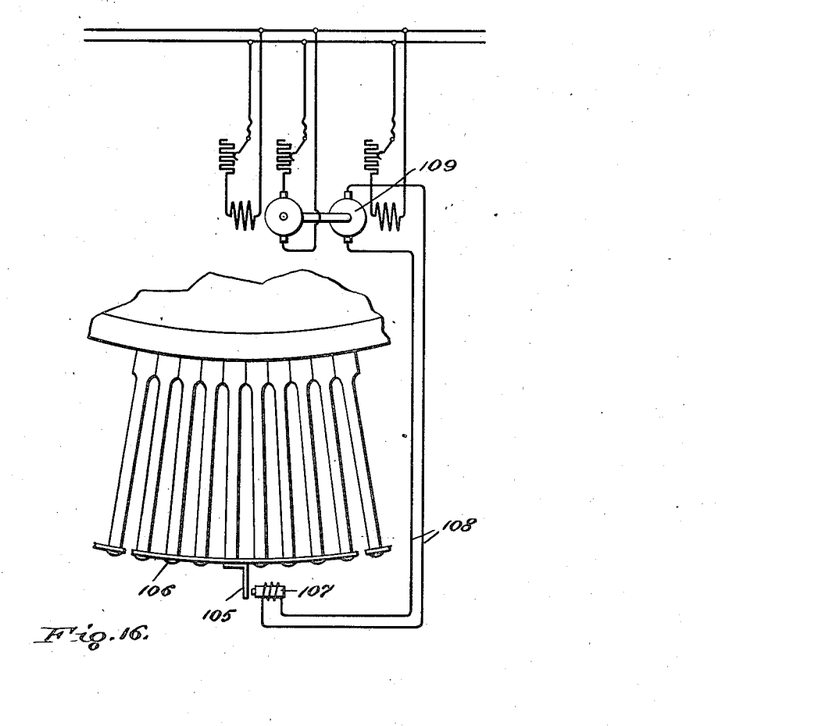
Fig. 16 illustrates an additional method for finding the natural frequency of tangential vibration of a bucket or bucket row when standing.

There are a number of well known ways for determining the natural frequency of vibration of a stationary body and any of them found suitable may be used for determining the natural standing frequency of tangential vibration of a row of buckets mounted on a rotor. One simple method is to mount an alternating current electromagnet adjacent to the bucket in a manner to exert a pull on them in a tangential direction and then supply to the magnet an alternating current, varying the frequency of the current until it reaches a value at which the buckets vibrate. The natural frequency of vibration of the bucket will be twice the frequency of the alternating current producing it since the alternating current will exert two attractions per cycle. An arrangement of this character is shown in Fig. 16 wherein 105 indicates an armature very light in weight fastened to a bucket group 106 by being brazed thereto or by other suitable means. Adjacent armature 105 is an electro-magnet 107 connected by lead wires 108 to an alternating current generator 109 the speed of which may be varied at will. For example, a motor generator set may be used. By varying the speed of the motor-generator set an alternating current of any desired frequency may be supplied to electro-magnet 107.

What I claim as new and desire to secure by Letters Patent of the United States, is:—

1. In an elastic fluid turbine, a rotor having a row of buckets thereon which buckets have a natural frequency of tangential vibration less than 3.5 times the normal operating speed of the turbine, characterized by the fact that said row of buckets is tuned in advance so that the rotor speeds of which the natural running frequencies of tangential vibration of the row of buckets are multiples are not closer to said normal operating speed than approximately 5% of such normal operating speed.

2. In an elastic fluid turbine, a rotor having a row of buckets thereon which buckets have a natural frequency of tangential vibration less than 3.5 times the normal operating speed of the turbine, characterized by the fact that said row of buckets is tuned in advance so that the rotor speed of which the natural running frequency of tangential vibration of the row of buckets is double is not closer to the normal operating speed than approximately 15% of such normal operating speed, and the rotor speed of which the natural running frequency of tangential vibration of the row of buckets is three times is not closer to the normal operating speed than approximately 10% of such normal operating speed.

3. In an elastic fluid turbine, a rotor having a row of buckets thereon which buckets have a natural frequency of tangential vibration less than 3.5 times the normal operating speed of the turbine, characterized by the fact that said row of buckets is tuned in advance so that the rotor speed of which the natural running frequency of tangential vibration of the row of buckets is double is not closer to the normal operating speed than approximately 15% of such normal operating speed, the rotor speed of which the natural running frequency of tangential vibration of the row of buckets is three times is not closer to the normal operating speed than approximately 10% of such normal operating speed, and the rotor speed of which the natural running frequency of tangential vibration of the row of buckets is four times is not closer to the normal operating speed than approximately 5% of such normal operating speed.

4. In an elastic fluid turbine, a rotor having a row of buckets thereon which buckets have a natural frequency of tangential vibration less than 3.5 times the normal operating speed of the turbine, said row of buckets being so constructed and proportioned in advance that the speeds of rotation of which the natural running frequencies of tangential vibration of the row of buckets are twice or three times are not closer to the normal operating speed of the turbine than approximately 15%, and 10%, respectively, of such normal operating speed.

5. In an elastic fluid turbine, a rotor having a row of buckets thereon which buckets have a natural frequency of tangential vibration less than 3.5 times the normal operating speed of the turbine, said row of buckets being so constructed and proportioned in advance that the speeds of rotation of which the natural running frequencies of tangential vibration of the row of buckets are twice, three times or four times are not closer to the normal operating speed of the turbine than approximately 15%, 10% and 5% respectively, of such normal operating speed.

6. In an elastic fluid turbine, a rotor having a plurality of rows of buckets thereon each of which rows comprises buckets having natural frequencies of tangential vibration less than 3.5 times the normal operating speed of the turbine, characterized by the fact that each of said rows of buckets is so constructed and proportioned in advance that in no instance is the speed of rotation of which the natural running frequency of tangential vibration of a row of buckets is twice or three times, closer to the normal operating speed of the turbine, than approximately 15% and 10% respectively, of such normal operating speed.

7. The method of constructing a turbine rotor having one or more rows of buckets thereon which buckets have natural frequencies of tangential vibration less than 3.5 times the normal operating speed of the turbine which consists in determining in advance the speeds of rotation of which the natural running frequencies of tangential vibration of such row or rows of buckets are twice, three times or four times, and then modifying the construction of any row of buckets having a critical speed so close to the normal operating speed of the turbine that trouble due to tangential vibration may occur to move such critical speed away from the normal operating speed.

8. The method of constructing a turbine rotor having one or more rows of buckets thereon which buckets have natural frequencies of tangential vibration less than 3.5 times the normal operating speed of the turbine, which consists in determining in advance the speeds of rotation of which the natural running frequencies of tangential vibration of such row or rows of buckets are twice, three times or four times, and then, if necessary, modifying the construction of any of said rows so that in no instance will any bucket row have a critical speed corresponding to a natural running frequency of tangential vibration two times the running speed within 15% of the normal operating speed, a critical speed corresponding to a natural running frequency of tangential vibration three times the running speed within 10% of the normal operating speed, or a critical speed corresponding to a natural running frequency of tangential vibration four times the running speed within 5% of the normal operating speed.

In witness whereof, I have hereunto set my hand this 21st day of June, 1923.

WILFRED CAMPBELL.